(12) United States Patent
Doeden (10) Patent No.: US 7,246,986 B2
(45) Date of Patent: Jul. 24, 2007

(54) SLAT CARRIER

(76) Inventor: Kenneth Doeden, 617 160th Ave., Slayton, MN (US) 56172

( * ) Notice: Subject to any disclaimer, the term of this patent is extended or adjusted under 35 U.S.C. 154(b) by 461 days.

(21) Appl. No.: 10/455,968

(22) Filed: Jun. 6, 2003

(65) Prior Publication Data

US 2004/0258509 A1  Dec. 23, 2004

(51) Int. Cl.
  *B60P 7/06* (2006.01)
(52) U.S. Cl. ..................... 414/483; 414/589
(58) Field of Classification Search ............... 414/458, 414/470, 482, 483, 589, 590, 10, 11; 280/789; 464/170, 176, 178; 74/609
  See application file for complete search history.

(56) References Cited

U.S. PATENT DOCUMENTS

| | | | |
|---|---|---|---|
| 1,239,771 A | 9/1917 | Collis | |
| 3,346,131 A | 10/1967 | Lundell | |
| 3,410,431 A | 11/1968 | Vik | |
| 3,529,736 A | 9/1970 | Lebre | |
| 3,795,336 A | 3/1974 | Acker et al. | |
| 3,815,768 A | 6/1974 | Goodwin | |
| 4,527,935 A * | 7/1985 | Fortenberry | 414/24.5 |
| 4,626,017 A | 12/1986 | Robertson | |
| 4,699,558 A | 10/1987 | Hagge et al. | |
| 4,824,129 A * | 4/1989 | Rehrig | 280/79.11 |
| 5,441,379 A | 8/1995 | Gilber, Jr. | |
| 5,464,315 A | 11/1995 | Palmer et al. | |
| 5,697,309 A | 12/1997 | Ogle et al. | |
| 5,988,659 A | 11/1999 | Young | |
| 6,264,184 B1 * | 7/2001 | Armstrong et al. | 269/17 |
| 6,270,299 B1 | 8/2001 | Rehbein | |

* cited by examiner

Primary Examiner—Charles A. Fox (57) ABSTRACT

A slat carrier for facilitating transportation of slats to be used in an animal pen. The slat carrier includes a support assembly being designed for selectively receiving the slat to be transported. A mounting assembly is rotatably coupled to the support assembly. The support assembly is rotated with respect to the mounting assembly whereby the support assembly is designed for rotating the slat from a horizontal position to a vertical position to facilitate transportation of the slat through doorways. The mounting assembly is designed for being selectively coupled to a vehicle whereby the mounting assembly permits the vehicle to transport the slat supported by the support assembly. A wheel assembly is coupled to the mounting assembly. The wheel assembly is designed for engaging a support surface whereby the wheel assembly facilitates transportation of the support assembly across the support surface.

23 Claims, 4 Drawing Sheets

SLAT CARRIER

BACKGROUND OF THE INVENTION

1. Field of the Invention

The present invention relates to load transporting devices and more particularly pertains to a new slat carrier for facilitating transportation of slats to be used in an animal pen.

2. Description of the Prior Art

The use of load transporting devices is known in the prior art. U.S. Pat. No. 3,529,736 describes a device for raising loads to allow for handling of the load. Another type of load transporting device is U.S. Pat. No. 5,441,379 having a hand cart for facilitating transportation and erecting of wall panels. U.S. Pat. No. 5,988,659 has a device for lifting and transporting panels. U.S. Pat. No. 3,795,336 has an apparatus coupled to a vehicle for lifting and transporting a building module. U.S. Pat. No. 6,270,299 has a system for securing a load of material during storage in transit. U.S. Pat. No. 1,239,771 has a truck that is positioned under a chicken coop and raised to lift the chicken coop and allow the chicken coop to be transported to a desired location. U.S. Pat. No. 5,697,309 has a apparatus for supporting a mattress and manipulating the mattress as is being sewn. U.S. Pat. No. 5,464,315 has an apparatus for compressing and lifting objects to facilitate transporting of the objects. U.S. Pat. No. 3,346,131 has a trailer having wheel assemblies that are vertically positionable to allow the for the trailer to be more conveniently loaded by a user. U.S. Pat. No. 3,410,431 has a clamp mechanism that is coupled to a forklift to allow the forklift handle materials not positioned on a pallet. U.S. Pat. No. 3,815,768 has a trailer for hauling wall panels or palletized loads. U.S. Pat. No. 4,626,017 has a trailer structure designed to transport sheets of glass or other frangible materials safely without damage to the materials. U.S. Pat. No. 4,699,558 has a cargo loader that is design for being positioned around a desired cargo and can lift the cargo.

While these devices fulfill their respective, particular objectives and requirements, the need remains for a device that has certain improved features for lifting and manipulating a slat for an animal pen.

SUMMARY OF THE INVENTION

The present invention meets the needs presented above by a support assembly rotated coupled to a mounting assembly to allow the slat coupled to the support assembly to be rotated to a desired position.

Still yet another object of the present invention is to provide a new slat carrier that allows the slat to rotated from a horizontal position to a vertical position to fit through doorways and thereby allow new slats to be transported into existing animal pens.

Even still another object of the present invention is to provide a new slat carrier that has the wheel assembly pivotally coupled to the mounting assembly to allow the slat coupled to the support assembly to be deposited on the floor of the animal pen.

To this end, the present invention generally comprises a support assembly being designed for selectively receiving the slat to be transported. A mounting assembly is rotatably coupled to the support assembly. The support assembly is rotated with respect to the mounting assembly whereby the support assembly is designed for rotating the slat from a horizontal position to a vertical position to facilitate transportation of the slat through doorways. The mounting assembly is designed for being selectively coupled to a vehicle whereby the mounting assembly permits the vehicle to transport the slat supported by the support assembly. A wheel assembly is coupled to the mounting assembly. The wheel assembly is designed for engaging a support surface whereby the wheel assembly facilitates transportation of the support assembly across the support surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
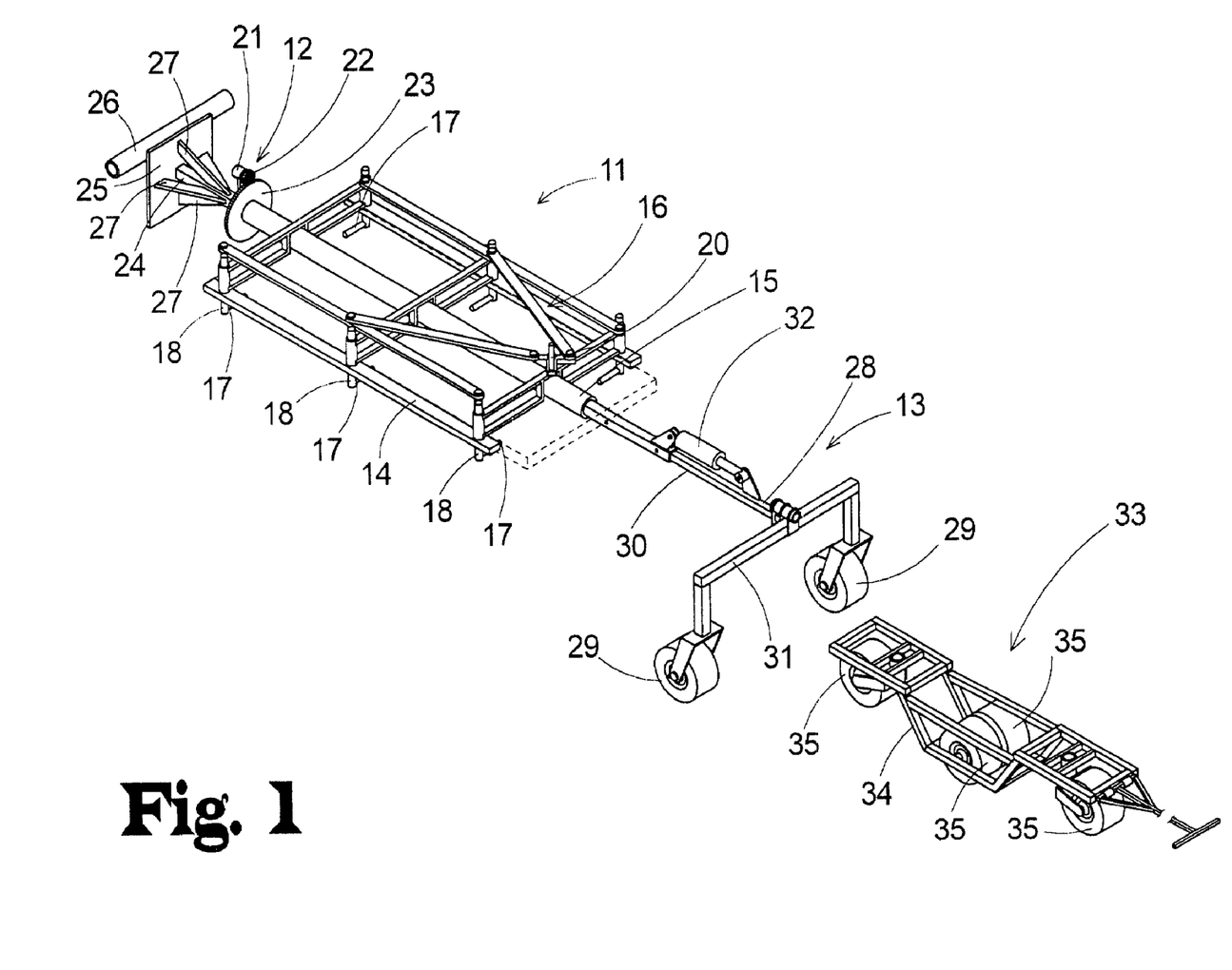
FIG. 1 is a perspective view of a new slat carrier according to the present invention.
Figure 2:
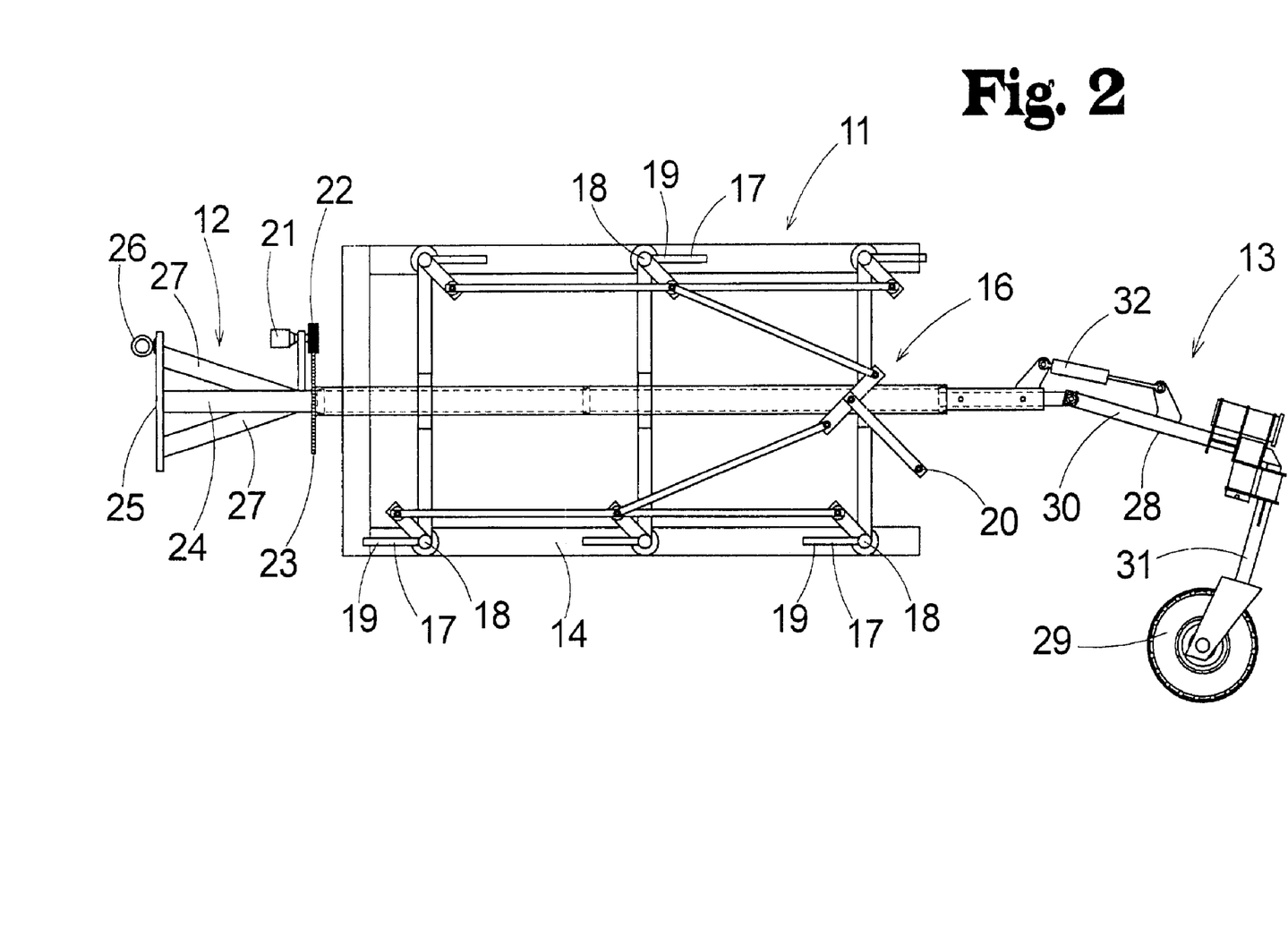
FIG. 2 is a side view of the present invention with the support assembly shown in the vertical position.
Figure 3:
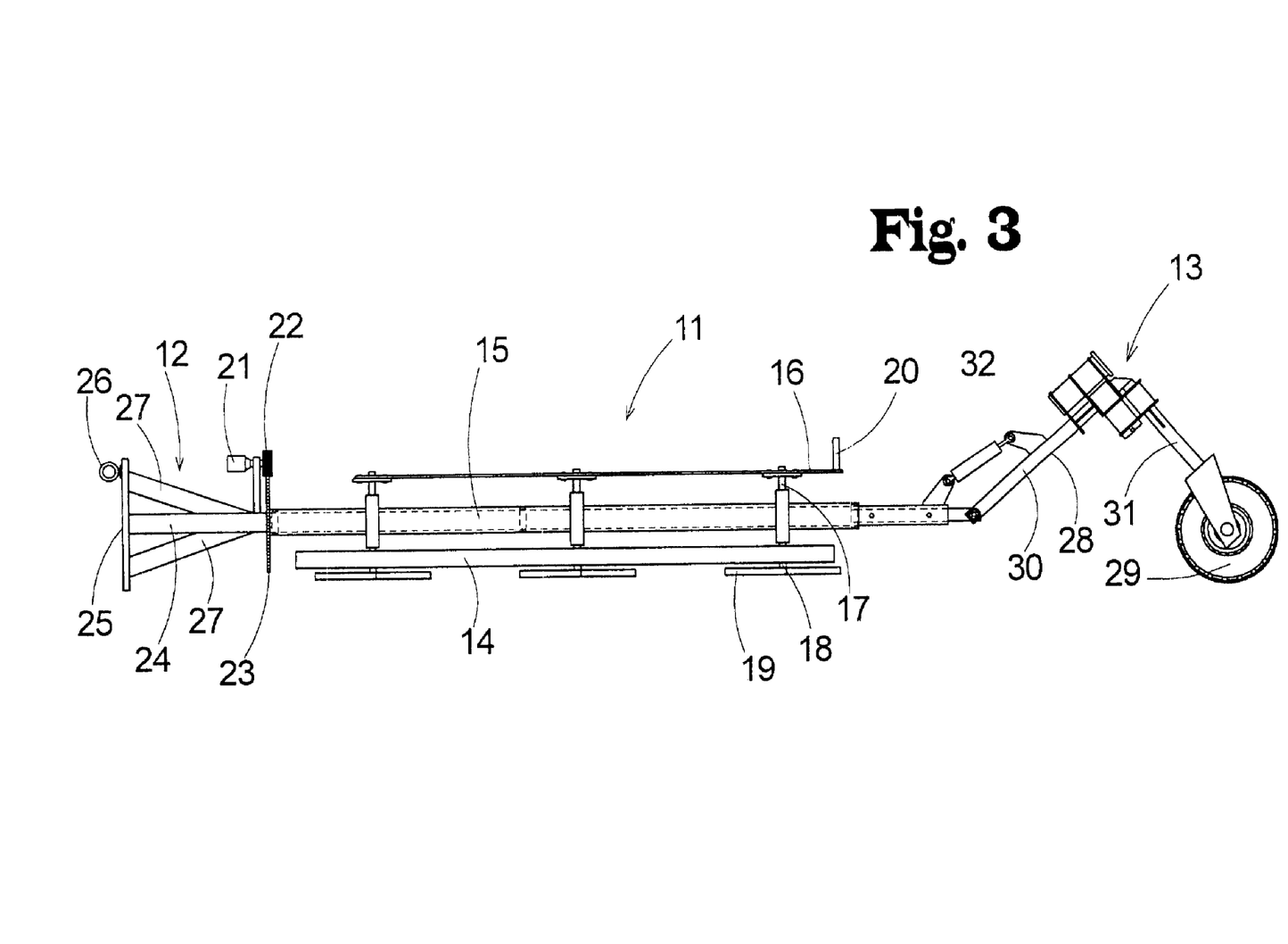
FIG. 3 is a side view of the present invention with the mounting assembly shown in a lowered position.
Figure 4:
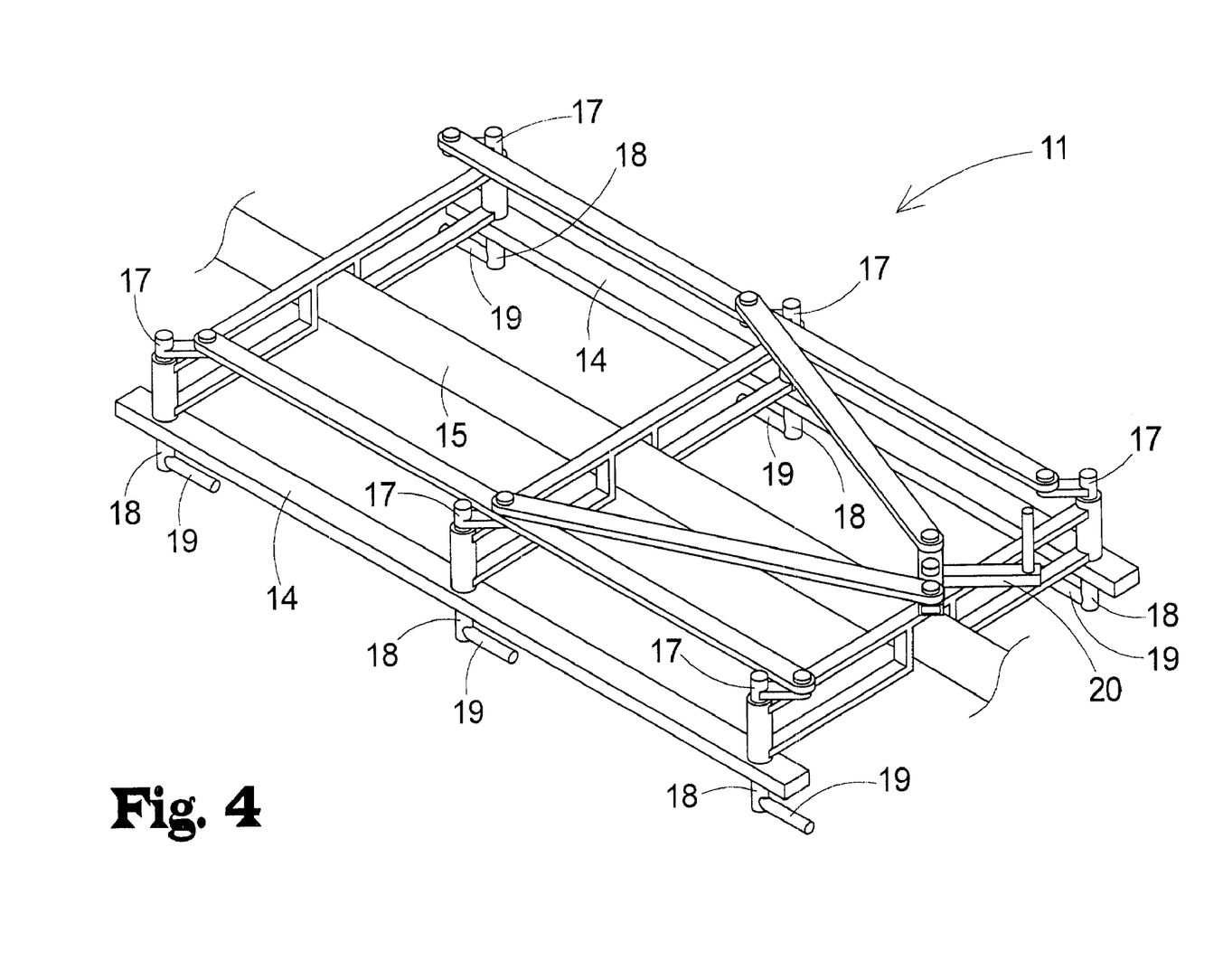
FIG. 4 is an enlarged perspective view of the securing assembly of the present invention.

With reference now to the drawings, and in particular to FIGS. 1 through 4 thereof, a new slat carrier embodying the principles and concepts of the present invention and generally designated by the reference numeral 10 will be described.

As best illustrated in FIGS. 1 through 4, the slat carrier 10 generally comprises a support assembly 11 being designed for selectively receiving the slat to be transported.

A mounting assembly 12 is rotatably coupled to the support assembly 11. The support assembly 11 is rotated with respect to the mounting assembly 12 whereby the support assembly 11 is designed for rotating the slat from a horizontal position to a vertical position to facilitate transportation of the slat through doorways. The mounting assembly 12 is designed for being selectively coupled to a vehicle whereby the mounting assembly 12 permits the vehicle to transport the slat supported by the support assembly 11.

A wheel assembly 13 is coupled to the mounting assembly 12. The wheel assembly 13 is designed for engaging a support surface whereby the wheel assembly 13 facilitates transportation of the support assembly 11 across the support surface.

The support assembly 11 comprises a frame member 14 and a pivot member 15. The frame member 14 is coupled to the pivot member 15 whereby the frame member 14 is designed for supporting the weight of the slat. The pivot member 15 is positioned around a portion of the mounting assembly 12 whereby the pivot member 15 selectively rotates around the mounting assembly 12 to allow the slat to be selectively pivoted between a horizontal position and a vertical position.

The support assembly 11 comprises a securing assembly 16. The securing assembly 16 is operationally coupled to the frame member 14. The securing assembly 16 is designed for engaging the slat whereby the securing assembly 16 is for securing the slat to the frame member 14.

The securing assembly 16 of the support assembly 11 comprises a plurality of armature members 17. Each of the armature members 17 is pivotally coupled to the frame member 14. Each of the armature members 17 is designed for being selectively pivoted over the slat to secure the slat between the armature members 17 and the frame member 14 to secure the slat member to the frame member 14 when the slat is positioned adjacent the frame member 14.

Each of the armature members 17 comprises a pivot portion 18 and an extension portion 19. The pivot portion 18 of each of the armature members 17 is pivotally coupled to the frame member 14. The extension portion 19 is coupled to the pivot portion 18 of the associated one of the armature members 17 opposite the frame assembly. The extension portion 19 of each of the armature members 17 is designed for being selectively extended over the slat to secure the slat to the frame member 14 when the pivot portion 18 of the associated one of the armature members 17 is pivoted with respect to the frame member 14.

The securing assembly 16 comprises a handle member 20. The handle member 20 is pivotally coupled to the frame member 14. The handle member 20 is operationally coupled to the armature members 17 whereby pivoting of the handle member 20 in a first direction pivots each of the armature members 17 with respect to the frame member 14 to secure the slat to the frame member 14. The handle member 20 is pivotal in a second direction to pivot the armature members 17 with respect to the frame member 14 to allow the slat to be removed from the frame member 14.

A motor member 21 is coupled to the mounting assembly 12. The motor member 21 is operationally coupled to the support assembly 11 whereby the motor member 21 rotates the support assembly 11 with respect to the mounting assembly 12 to rotate the slat between the horizontal position and the vertical position when the motor member 21 is actuated by the user.

A first gear member 22 is coupled to the motor member 21 whereby the first gear member 22 is selectively rotated by the motor member 21. A second gear member 23 is coupled to the pivot member 15 of the support assembly 11. The first gear member 22 is operationally coupled to the second member whereby the second gear member 23 is rotated by the first gear member 22 to rotate the support assembly 11 with respect to the mounting assembly 12 when the first gear member 22 is rotated by the motor member 21.

The mounting assembly 12 comprises a main member 24. The pivot member 15 of the support assembly 11 is rotationally coupled to the main member 24 of the mounting assembly 12. The main member 24 is designed for being selectively coupled to the vehicle whereby the main member 24 is for supporting the weight of the slat when the slat is being transported by the vehicle.

The mounting assembly 12 comprises a mounting plate 25. The mounting plate 25 is coupled to the main member 24 whereby the mounting plate 25 is positioned opposite the wheel assembly 13. The mounting plate 25 is designed for being coupled to the vehicle whereby the mounting plate 25 secures the main member 24 to the vehicle.

The mounting assembly 12 comprises a sleeve portion 26. The sleeve portion 26 is coupled to the mounting plate 25. The sleeve portion 26 is designed for being operationally coupled to the vehicle whereby the sleeve portion 26 permits the mounting assembly 12 to maintain a substantially parallel orientation with the support surface when the mounting assembly 12 is raised and lowered by the vehicle.

The mounting assembly 12 comprises a plurality of bracing members 27. Each of the bracing members 27 extends between the main member 24 and the mounting plate 25 of the mounting assembly 12 whereby the bracing members 27 are for bracing the main member 24 when the main member 24 is supporting the weight of the slat.

The wheel assembly 13 comprises an arm member 28 and a pair of wheels 29. The wheels 29 are rotatably coupled to the arm member 28 whereby the wheels 29 are designed for rolling across the support surface. The arm member 28 is pivotally coupled to the main member 24 of the mounting assembly 12 whereby the arm member 28 changes angle with respect to the main member 24 of the mounting assembly 12 to maintain contact between the wheels 29 and the support surface when the vehicle raises and lowers the mounting assembly 12.

The arm member 28 comprises a tongue portion 30 and a stabilizing portion 31. The tongue portion 30 is pivotally coupled to the main member 24 of the mounting assembly 12. The stabilizing portion 31 is coupled to the tongue portion 30 whereby the stabilizing portion 31 is positioned opposite the mounting assembly 12. The wheels 29 are rotatably coupled to the stabilizing portion 31 whereby the wheels 29 are positioned in a spaced relationship to inhibit tipping of the support assembly 11. The mounting assembly 12 and the wheel assembly 13 when in use.

A biasing member 32 is coupled to the main member 24 of the mounting assembly 12 and the arm member 28 of the wheel assembly 13. The biasing member 32 biasing the arm member 28 of the wheel assembly 13 away from the mounting assembly 12 whereby the biasing member 32 is for biasing the wheels 29 against the support surface when the mounting assembly 12 is being raised and lowered by the vehicle. The biasing member 32 may comprise a ram to maintain contact between the wheels 29 and the support surface.

A cart assembly 33 is selectively positionable under the support assembly 11 when the support assembly 11 is in a horizontal position. The cart assembly 33 is designed for supporting the slat above the support surface whereby the cart assembly 33 supports the slat under the support assembly 11 when the support assembly 11 is receiving the slat.

The cart assembly 33 comprises chassis member 34 and a plurality of rollers 35. The chassis member 34 is designed for receiving the slat in a horizontal position. Each of the rollers 35 is rotatably coupled to the chassis member 34 whereby the rollers 35 are designed for rolling across the support surface to facilitate movement of the chassis member 34 and the slat across the support surface.

In use, the user places a slat onto the chassis member 34 of the cart member and positions the slat under the frame member 14 of the support assembly 11. The vehicle lowers the mounting assembly 12 so that the frame member 14 of the support assembly 11 abuts the slat member. The user then pivots the handle member 20 in the first direction to pivot the armature members 17 to engage the slat and secure the slat between the armature members 17 and the frame member 14. The vehicle is then used to raise the mounting assembly 12 and the cart assembly 33 is removed from below the support assembly 11. The motor member 21 is then actuated to rotates the support assembly 11 and the slat into a vertical position. The vehicle then tows mounting assembly 12, the wheel assembly 13 and the support assembly 11 with the slat through a doorway so that the slat is positioned in the animal pen. The motor member 21 is actuated again to rotate the support assembly 11 and the slat back into the horizontal position and the mounting assembly 12 is lowered by the vehicle. The handle member 20 is pivoted in the second direction so that the armature members 17 pivot and disengage the slat so that the slat can be placed on the floor of the animal pen and then placed in the desired location. The vehicle then raises the mounting assembly 12 and the motor member 21 is actuated to rotate the support assembly 11 into the vertical position so that the mounting assembly 12, the support assembly 11 and the wheel assembly 13 can be transported through the doorway to repeat the process for the desired number of slats to be placed in the animal pen.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slat carrier for facilitating transporting a slat used in an animal pen, the slat carrier comprising:
    a support assembly being adapted tar selectively receiving the slat to be transported;
    a mounting assembly being rotatably coupled to said support assembly, said support assembly being rotated with respect to said mounting assembly such that said support assembly is adapted for rotating the slat from a horizontal position to a vertical position said mounting assembly being adapted for being selectively coupled to a vehicle such that said mounting assembly permits the vehicle to transport the slat supported by said support assembly; and
    a wheel assembly being coupled to said mounting assembly, said wheel assembly being adapted for engaging a support surface such that said wheel assembly facilitates transportation of said support assembly across the support surface;
    wherein said wheel assembly comprises an arm member and at least one wheel, said wheel being rotatably coupled to said arm member such that said wheel is adapted for rolling across the support surface, said arm member being pivotally coupled to said mounting assembly such that said arm member changes angle with respect to said mounting assembly to maintain contact between said wheel and the support surface when the vehicle raises and lowers said mounting assembly.

2. The slat carrier as set forth in claim 1, wherein said support assembly comprises a frame member and a pivot member, said frame member being coupled to said pivot member such that said frame member is adapted for supporting the weight of the slat, said pivot member being positioned around a portion of said mounting assembly such that said pivot member selectively rotates around said mounting assembly to allow the slat to be selectively pivoted between a horizontal position and a vertical position.

3. The slat carrier as set forth in claim 2, wherein said support assembly comprises a securing assembly, said securing assembly being operationally coupled to said frame member, said securing assembly being adapted for engaging the slat such that said securing assembly is for securing the slat to said frame member.

4. The slat carrier as set forth in claim 1, further comprising:
    a motor member being coupled to said mounting assembly, said motor member being operationally coupled to said support assembly such that said motor member rotates said support assembly with respect to said mounting assembly to rotate the slat between the horizontal position and the vertical position when said motor member is actuated by the user.

5. The slat carrier as set forth in claim 1, wherein said mounting assembly comprises a main member, said support assembly being rotationally coupled to said main member of said mounting assembly, said main member being adapted for being selectively coupled to the vehicle such that said main member is for supporting the weight of the slat when the slat is being transported by the vehicle.

6. The slat carrier as set forth in claim 5, wherein said mounting assembly comprises a mounting plate, said mounting plate being coupled to said main member such that said mounting plate is positioned opposite said wheel assembly, said mounting plate being adapted for being coupled to the vehicle such that said mounting plate secures said main member to the vehicle.

7. The slat carrier as set forth in claim 6, wherein said mounting assembly comprises a sleeve portion, said sleeve portion being coupled to said mounting plate, said sleeve portion being adapted for being operationally coupled to the vehicle such that said sleeve portion permits said mounting assembly to maintain a substantially parallel orientation with the support surface when said mounting assembly is raised and lowered by the vehicle.

8. The slat carrier as set forth in claim 6, wherein said mounting assembly comprises a plurality of bracing members, each of said bracing members extending between said main member and said mounting plate of said mounting assembly such that said bracing members are for bracing said main aiember when said main member is supporting the weight of the slat.

9. The slat carrier as set forth in claim 1, further comprising:
    a biasing member being coupled to said mounting assembly and said arm member of said wheel assembly, said biasing member biasing said arm member of said wheel assembly away from said mounting assembly such that said biasing member is for biasing said wheel against the support surface when said mounting assembly is being raised and lowered by the vehicle.

10. The slat carrier as set forth in claim 9, wherein said biasing member comprises a ram, said ram being coupled between said mounting assembly and said arm member of said wheel assembly, said ram being for biasing said wheel of said wheel assembly against the support surface when said mounting assembly is being raised and lowered by the vehicle.

11. The slat carrier as set forth in claim 1. further comprising:
    a cart assembly being selectively positionable under said support assembly when said support assembly is in a horizontal position, said cart assembly being adapted for supporting the slat above the support surface such that said cart assembly supports the slat under said support assembly when said support assembly is receiving the slat.

12. The slat carrier as set forth in claim 11, further comprising:

said cart assembly comprising chassis member and a plurality of rollers, said chassis member being adapted for receiving the slat in a horizontal position, each of said rollers being rotatably coupled to said chassis member such that said rollers are adapted for rolling across the support surface to facilitate movement of said chassis member and the slat across the support surface.

13. A slat carrier for facilitating transporting a slat used in an animal pen, the slat carrier comprising:

a support assembly being adapted for selectively receiving the slat to be transported;

a mounting assembly being rotatably coupled to said support assembly, said support assembly being rotated with respect to said mounting assembly such that said support assembly is adapted for rotating the slat from a horizontal position to a vertical position said mounting assembly being adapted for being selectively coupled to a vehicle such that said mounting assembly permits the vehicle to transport the slat supported by said support assembly; and a wheel assembly being coupled to said mounting assembly, said wheel assembly being adapted for engaging a support surface such that said wheel assembly facilitates transportation of said support assembly across the support surface;

wherein said support assembly comprises a frame member and a pivot member, said frame member being coupled to said pivot member such that said frame member is adapted for supporting the weight of the slat, said pivot member being positioned around a portion of said mounting assembly such that said pivot member selectively rotates around said mounting assembly to allow the slat to be selectively pivoted between a horizontal position and a vertical position;

wherein said support assembly comprises a securing assembly, said securing assembly being operationally coupled to said frame member, said securing assembly being adapted for engaging the slat such that said securing assembly is for securing the slat to said frame member;

wherein said securing assembly of said support assembly comprises a plurality of armature members, each of said armature members being pivotally coupled to said frame member, each of said armature members being adapted for being selectively pivoted over the slat to secure the slat between said armature members and said frame member to secure the slat member to said frame member when the slat is positioned adjacent said frame member.

14. The slat carrier as set forth in claim 13, wherein each of said armature members comprises a pivot portion and an extension portion, said pivot portion of each of said armature members being pivotally coupled to said frame member, said extension portion being coupled to said pivot portion of the associated one of said armature members opposite said frame assembly, said extension portion of each of said armature members being adapted for being selectively extended over the slat to secure the slat to the frame member when said pivot portion of the associated one of said armature members is pivoted with respect to said frame member.

15. The slat carrier as set forth in claim 13, wherein said securing assembly a handle member, said handle member being pivotally coupled to said frame member, said handle member being operationally coupled to said armature members such that pivoting of said handle member in a first direction pivots each of said armature members with respect to said frame member to secure the slat to said frame member, said handle member being pivotal in a second direction to pivot said armature members with respect to said frame member to allow the slat to be removed from said frame member.

16. A slat carrier for facilitating transporting a slat used in an animal pen, the slat carrier comprising:

a support assembly being adapted for selectively receiving the slat to be transported;

a mounting assembly being rotatably coupled to said support assembly, said support assembly being rotated with respect to said mounting assembly such that said support assembly is adapted for rotating the slat from a horizontal position to a vertical position said mounting assembly being adapted for being selectively coupled to a vehicle such that said mounting assembly permits the vehicle to transport the slat supported by said support assembly; and a wheel assembly being coupled to said mounting assembly, said wheel assembly being adapted for engaging a support surface such that said wheel assembly facilitates transportation of said support assembly across the support surface;

a motor member being coupled to said mounting assembly, said motor member being operationally coupled to said support assembly such that said motor member rotates said support assembly with respect to said mounting assembly to rotate the slat between the horizontal position and the vertical position when said motor member is actuated by the user;

a first gear member being coupled to said motor member such that said first gear member is selectively rotated by said motor member, a second gear member being coupled to said support assembly, said first gear member being operationally coupled to said second member such that said second gear member is rotated by said first gear member to rotate said support assembly with respect to said mounting assembly when said first gear member is rotated by said motor member.

17. A slat carrier for facilitating transporting a slat used in an animal pen, the slat carrier comprising;

a support assembly being adapted for selectively receiving the slat to be transported;

a mounting assembly being rotatably coupled to said support assembly, said support assembly being rotated with respect to said mounting assembly such that said support assembly is adapted for rotating the slat from a horizontal position to a vertical position said mounting assembly being adapted for being selectively coupled to a vehicle such that said mounting assembly permits the vehicle to transport the slat supported by said support assembly;

a wheel assembly being coupled to said mounting assembly, said wheel assembly being adapted for engaging a support surface such that said wheel assembly facilitates transportation of said support assembly across the support surface;

said support assembly comprising a frame member and a pivot member, said frame member being coupled to said pivot member such that said frame member is adapted for supporting the weight of the slat, said pivot member being positioned around a portion of said mounting assembly such that said pivot member selectively rotates around said mounting assembly to allow the slat to be selectively pivoted between a horizontal position and a vertical position;

said support assembly comprising a securing assembly, said securing assembly being operationally coupled to said frame member, said securing assembly being adapted for engaging the slat such that said securing assembly is for securing the slat to said frame member;

said securing assembly of said support assembly comprising a plurality of armature members, each of said armature members being pivotally coupled to said frame member, each of said armature members being adapted for being selectively pivoted over the slat to secure the slat between said armature members and said frame member to secure the slat member to said frame member when the slat is positioned adjacent said frame member;

each of said armature members comprising a pivot portion and an extension portion, said pivot portion of each of said armature members being pivotally coupled to said frame member, said extension portion being coupled to said pivot portion of the associated one of said armature members opposite said frame assembly, said extension portion of each of said armature members being adapted for being selectively extended over the slat to secure the slat to the frame member when said pivot portion of the associated one of said armature members is pivoted with respect to said frame member;

said securing assembly comprising a handle member, said handle member being pivotally coupled to said frame member, said handle member being operationally coupled to said armature members such that pivoting of said handle member in a first direction pivots each of said armature members with respect to said frame member to secure the slat to said frame member, said handle member being pivotal in a second direction to pivot said armature members with respect to said frame member to allow the slat to be removed from said frame member;

a motor member being coupled to said mounting assembly, said motor member being operationally coupled to said support assembly such that said motor member rotates said support assembly with respect to said mounting assembly to rotate the slat between the horizontal position and the vertical position when said motor member is actuated by the user;

a first gear member being coupled to said motor member such that said first gear member is selectively rotated by said motor member, a second gear member being coupled to said pivot member of said support assembly, said first gear member being operationally coupled to said second member such that said second gear member is rotated by said first gear member to rotate said support assembly with respect to said mounting assembly when said first gear member is rotated by said motor member;

said mounting assembly comprising a main member, said pivot member of said support assembly being rotationally coupled to said main member of said mounting assembly, said main member being adapted for being selectively coupled to the vehicle such that said main member is for supporting the weight of the slat when the slat is being transported by the vehicle;

said mounting assembly comprising a mounting plate, said mounting plate being coupled to said main member such that said mounting plate is positioned opposite said wheel assembly, said mounting plate being adapted for being coupled to the vehicle such that said mounting plate secures said main member to the vehicle;

said mounting assembly comprising a sleeve portion, said sleeve portion being coupled to said mounting plate, said sleeve portion being adapted for being operationally coupled to the vehicle such that said sleeve portion permits said mounting assembly to maintain a substantially parallel orientation with the support surface when said mounting assembly is raised and lowered by the vehicle;

said mounting assembly comprising a plurality of bracing members, each of said bracing members extending between said main member and said mounting plate of said mounting assembly such that said bracing members are for bracing said main member when said main member is supporting the weight of the slat;

said wheel assembly comprising an arm member and a pair of wheels, said wheels being rotatably coupled to said arm member such that said wheels are adapted for rolling across the support surface, said arm member being pivotally coupled to said main member of said mounting assembly such that said arm member changes angle with respect to said main member of said mounting assembly to maintain contact between said wheels and the support surface when the vehicle raises and lowers said mounting assembly;

said arm member comprising a tongue portion and a stabilizing portion, said tongue portion being pivotally coupled to said main member of said mounting assembly) said stabilizing portion being coupled to said tongue portion such that said stabilizing portion is positioned opposite said mounting assembly, said wheels being rotatably coupled to said stabilizing portion such that said wheels are positioned in a spaced relationship to inhibit tipping of said support assembly, said mounting assembly and said wheel assembly when in use; and a biasing member being coupled to said main member of said mounting assembly and said arm member of said wheel assembly, said biasing member biasing said arm member of said wheel assembly away from said mounting assembly such that said biasing member is for biasing said wheels against the support surface when said mounting assembly is being raised and lowered by the vehicle.

18. The slat carrier as set forth in claim 17, further comprising:

a cart assembly being selectively positionable under said support assembly when said support assembly is in a horizontal position, said cart assembly being adapted for supporting the slat above the support surface such that said cart assembly supports the slat under said support assembly when said support assembly is receiving the slat.

19. The slat carrier as set forth in claim 18, wherein said cart assembly comprising chassis member and a plurality of rollers, said chassis member being adapted for receiving the slat in a horizontal position, each of said rollers being rotatably coupled to said chassis member such that said rollers are adapted for rolling across the support surface to facilitate movement of said chassis member and the slat across the support surface.

20. A slat carrier for facilitating transporting a slat used in an animal pen, the slat being of the type having opposite broad faces and substantially parallel side edges and substantially parallel end edges, the slat carrier comprising:

- a support assembly configured to selectively receive the slat to be transported, said support assembly being configured to engage opposite edge portions of the broad faces of the slat;
- a mounting assembly being rotatably coupled to said support assembly, said support assembly being rotatable with respect to said mounting assembly such that said support assembly is configured to rotate the slat from a position with one of the broad faces in a substantially horizontal orientation to a position with one of the broad faces in a substantially vertical orientation; and
- a wheel assembly coupled to said mounting assembly, said wheel assembly being configured to at least partially support said mounting assembly on a support surface and permit movement of said mounting assembly across the support surface with the slat in the substantially vertical orientation.

21. The slat carrier as set forth in claim 20, wherein said support assembly and mounting assembly are configured to support the slat with one of the broad faces in the substantially horizontal orientation during movement of said mounting assembly across the support surface.

22. The slat carrier as set forth in claim 20, wherein said support assembly is configured to rotate a slat about an axis substantially parallel to a substantially central longitudinal axis of the slat upon rotation of said support assembly on said mounting assembly to move the slat between the position with one of the broad faces in a substantially horizontal orientation to the position with one of the broad faces in a substantially vertical orientation.

23. The slat carrier as set forth in claim 20, wherein said slat has a substantially rectangular perimeter formed of the side and end edges;

- wherein said support assembly and mounting assembly are configured to support the slat with one of the broad faces in the substantially horizontal orientation during movement of said mounting assembly across the support surface;
- wherein said support assembly is configured to rotate a slat about an axis substantially parallel to a substantially central longitudinal axis of the slat upon rotation of said support assembly on said mounting assembly to move the slat between the position with one of the broad faces in a substantially horizontal orientation to the position with one of the broad faces in a substantially vertical orientation;
- wherein said support assembly and mounting assembly are configured to support the slat with one of the broad faces in the substantially horizontal orientation during movement of said mounting assembly across the support surface.

* * * * *